United States Patent
Lin

(10) Patent No.: US 8,090,205 B2
(45) Date of Patent: Jan. 3, 2012

(54) METHOD FOR EDGE MATCHING IN FILM AND IMAGE PROCESSING

(75) Inventor: Shu Lin, Santa Clarita, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1179 days.

(21) Appl. No.: 11/795,442

(22) PCT Filed: Jul. 28, 2005

(86) PCT No.: PCT/US2005/026948
§ 371 (c)(1),
(2), (4) Date: Jul. 17, 2007

(87) PCT Pub. No.: WO2006/080953
PCT Pub. Date: Aug. 3, 2006

(65) Prior Publication Data
US 2008/0122959 A1    May 29, 2008

Related U.S. Application Data

(60) Provisional application No. 60/647,682, filed on Jan. 27, 2005.

(51) Int. Cl.
*G06K 9/48* (2006.01)
(52) U.S. Cl. .................................. 382/199
(58) Field of Classification Search ............. 382/199
See application file for complete search history.

(56) References Cited

U.S. PATENT DOCUMENTS

| | | |
|---|---|---|
| 4,959,790 A | 9/1990 | Morgan |
| 5,170,441 A | 12/1992 | Mimura et al. |
| 5,198,897 A | 3/1993 | Baldwin |
| 5,475,428 A | 12/1995 | Hintz et al. |
| 5,828,769 A | 10/1998 | Burns |
| 6,111,984 A * | 8/2000 | Fukasawa .................. 382/209 |
| 6,233,277 B1 | 5/2001 | Ozcelik et al. |
| 2001/0028738 A1 | 10/2001 | Pettigrew et al. |
| 2002/0031263 A1 | 3/2002 | Yamakawa |
| 2002/0034337 A1 | 3/2002 | Shekter |
| 2002/0083859 A1 | 7/2002 | Hauck et al. |
| 2003/0128280 A1* | 7/2003 | Perlmutter et al. ........ 348/222.1 |
| 2004/0028258 A1 | 2/2004 | Naimark et al. |

(Continued)

FOREIGN PATENT DOCUMENTS
GB      2360895      10/2001

(Continued)

OTHER PUBLICATIONS

Krenzle, "Film Restoration," XP-002353456, Restoration, May 1, 2004, http://www.postmagazine.com/ME2/dirmond.asp!sid=63930E9D02644EC9A127AF67602DA.

(Continued)

*Primary Examiner* — Aaron W Carter
(74) *Attorney, Agent, or Firm* — Robert D. Shedd; Robert B. Levy

(57) ABSTRACT

A method for edge mapping images for use in image processing. Edge mapping includes identifying base and non-base color components. A search window in the base color component is opened and the non-base color components are compared with the base component picture. The number of matched or unmatched edge points is then calculated. The best match can then be determined through testing or manual selection.

14 Claims, 12 Drawing Sheets

U.S. PATENT DOCUMENTS

| | | |
|---|---|---|
| 2004/0130680 A1 | 7/2004 | Zhou et al. |
| 2005/0041121 A1 | 2/2005 | Steinberg et al. |
| 2006/0013310 A1 | 1/2006 | Lee et al. |
| 2008/0118144 A1 | 5/2008 | Lin |
| 2008/0122959 A1 | 5/2008 | Lin |

FOREIGN PATENT DOCUMENTS

| | | |
|---|---|---|
| WO | 03058976 A1 | 7/2003 |

OTHER PUBLICATIONS

Kuran, "Optical Restoration of Faded 35mm Color Negative," XP-000689483, Application/Practices Paper, SMPTE Journal, May 1997.

MacQueen et al., "First Person: Restoring Film with Digital Recombination," XP-002353457, Millimeter, Aug. 1, 2000.

Robley, An In-Depth Examination of the Insidious Virus that is Eating Away at America's Cinematic Heritage, XP-002353458, Vinegar Syndrome Articles, Jun. 1996.

Unknown, Cinetech News Briefs, Spring 2002, Valencia, CA 4 pages.

Rudolph, Eric: "Saving Past Classics in Cineric,",American Cinematographer,Sep. 2000, vol. 81, No. 9. pp. 161-162.

Rudolph, Eric: "Saving Past Classics in Cineric,", American Cinematographer, Sep. 2000, vol. 81, No. 9. pp. 161-162.

Office Action U.S. Appl. No. 11/795,852 mailed Sep. 17, 2010.

Notice of Allowance U.S. Appl. No. 11/795,852, mailed Mar. 28, 2011.

Office Action U.S. Appl. No. 11/795,852 mailed May 20, 2011.

RCE U.S. Appl. No. 11/795,852 mailed Jun. 24, 2011.

Notice of Allowance U.S. Appl. No. 11/795,852, mailed Jul. 11, 2011.

\* cited by examiner

|   | ●1 | ●2 | ●1 |   |
|---|---|---|---|---|
| ●1 | ●3 | ●4 | ●3 | ●1 |
| ●2 | ●4 | ⑤ | ●4 | ●2 |
| ●1 | ●3 | ●4 | ●3 | ●1 |
| ●0 | ●1 | ●2 | ●1 | ●0 |

FIG. 4d

| 0 | 0 | 0 | 1 | 3 | 4 | 3 | 1 | 0 | 0 | 0 |
|---|---|---|---|---|---|---|---|---|---|---|
| 0 | 0 | 1 | 3 | 4 | ⑤ | 4 | 2 | 0 | 0 | 0 |
| 0 | 1 | 3 | 4 | ⑤ | 4 | 3 | 1 | 0 | 0 | 0 |
| 0 | 2 | 4 | ⑤ | 4 | 3 | 1 | 0 | 0 | 0 | 0 |
| 0 | 2 | 4 | ⑤ | 4 | 2 | 0 | 0 | 0 | 0 | 0 |
| 0 | 2 | 4 | ⑤ | 4 | 2 | 0 | 0 | 0 | 0 | 0 |
| 0 | 2 | 4 | ⑤ | 4 | 3 | 1 | 0 | 0 | 0 | 0 |
| 0 | 1 | 3 | 4 | ⑤ | 4 | 3 | 1 | 0 | 0 | 0 |
| 0 | 0 | 1 | 3 | 4 | ⑤ | 4 | 3 | 2 | 1 | 0 |
| 0 | 0 | 0 | 1 | 3 | 4 | ⑤ | 4 | 4 | 3 | 1 | 0 |
| 0 | 0 | 0 | 0 | 1 | 3 | 4 | ⑤ | ⑤ | 4 | 2 | 0 |
| 0 | 0 | 0 | 0 | 0 | 1 | 3 | 4 | 4 | 3 | 1 | 0 |

FIG. 4e

METHOD FOR EDGE MATCHING IN FILM AND IMAGE PROCESSING

CROSS REFERENCE TO RELATED APPLICATIONS

This application claims the benefit, under 35 U.S.C. §365 of International Application PCT/US2005/026948 filed Jul. 28, 2005 which was published in accordance with PCT Article 21(2) on Aug. 3, 2006 in English and which claims the benefit of U.S. provisional patent application No. 60/647,682 filed Jan. 27, 2005.

BACKGROUND OF THE INVENTION

1. Field of the Invention

The present invention relates to image processing. More particularly, it relates to a method for performing edge matching of film images.

2. Description of the Prior Art

Edge matching is used in many different film processing applications. One such application is the preservation/restoration of films. In order to store a color film for a long time and reduce the effect of color fading, the color film is separated into three-color components, Cyan, Magenta, and Yellow (CMY). Each color component is stored on a separate reel. When the time comes to re-release the film, the color components on each of these three reels need to be re-combined. In this regard, the CMY components need to be registered to obtain resulting re-combined color images that appear to be the same color as the images on the original color film. Most CMY registration is performed using photo-chemical techniques. Unfortunately, as the CMY reels age, the film on each reel is subject to distortion or shrinkage. In this environment, such photo-chemical based CMY registration does not perform well. As such, it requires registration to be performed using digital technology. In this case, registration is performed manually. However, manual registration is labor and cost intensive.

SUMMARY OF THE INVENTION

It is an aspect of the invention to provide a method for edge matching that increases the efficiency and accuracy of the image processing. This an other aspects are achieved in accordance with embodiments of the invention, where the method for edge matching includes comparing non-base color edges with a base color, calculating a number of unmatched edge points, and selecting the best match.

The selection of the best match may be based on the smallest number of unmatched points or the largest number of matched points. The best match can be tested for by calculating the number of mis-match edge points at a predetermined position, comparing the identified mis-match edges to a number of positions adjacent said predetermined position, and determining whether the calculated number of mis-match edge points is less than the number of positions adjacent said predetermined position.

According to various embodiments, the number of positions adjacent said predetermined position can be eight, or less than eight.

According to other aspects of the invention, the method for edge matching includes creating an edge map of a non-base color component, opening a search window in a base color component, moving a block of the non-base color component within the search window of the base color component, calculating difference values for each position between the non base and base color component, and identifying a position that has a minimum value of the sum of all of the calculated differences. The sum of calculated differences is preferably a sum of the absolute differences.

The creating of an edge map includes assigning a value to a pixel position according to its distance from an edge pixel. In other more specific examples, a first value is assigned to each edge pixel, a second value is assigned to each pixel that is located at a pixel distance (d) from a nearest edge pixel, a third value is assigned to each pixel that is located a distance $\sqrt{2}$ d from the nearest edge pixel, a fourth value is assigned to each pixel that is located a distance 2 times the pixel distance d from the nearest edge pixel, a fifth value is assigned to each pixel that is located a distance $\sqrt{5}$ d from the nearest edge pixel, and all other pixels are assigned a value of zero.

The assigned values are preferably mapped onto a grid.

The correlations between the base and non-base color components are calculated once the edge maps have been created for each component. In other embodiments, the correlations are calculated once the edge map have been created for the non-base color components.

According to other aspects of the invention, the method for edge matching includes creating an edge map of a first color component, opening a search window in second color component, moving a block of the first color component within the search window of the second color component, calculating difference values for each position between the first and second color component, and identifying a position that has a minimum value of the sum of all of the calculated differences.

Other aspects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIG. 4b is an exemplary diagram of the edge matching method according to an embodiment of the invention;

FIGS. 4c-e diagrammatically show an edge matching method according to an embodiment of the invention;

DETAILED DESCRIPTION OF PREFERRED EMBODIMENTS

Figure 1:
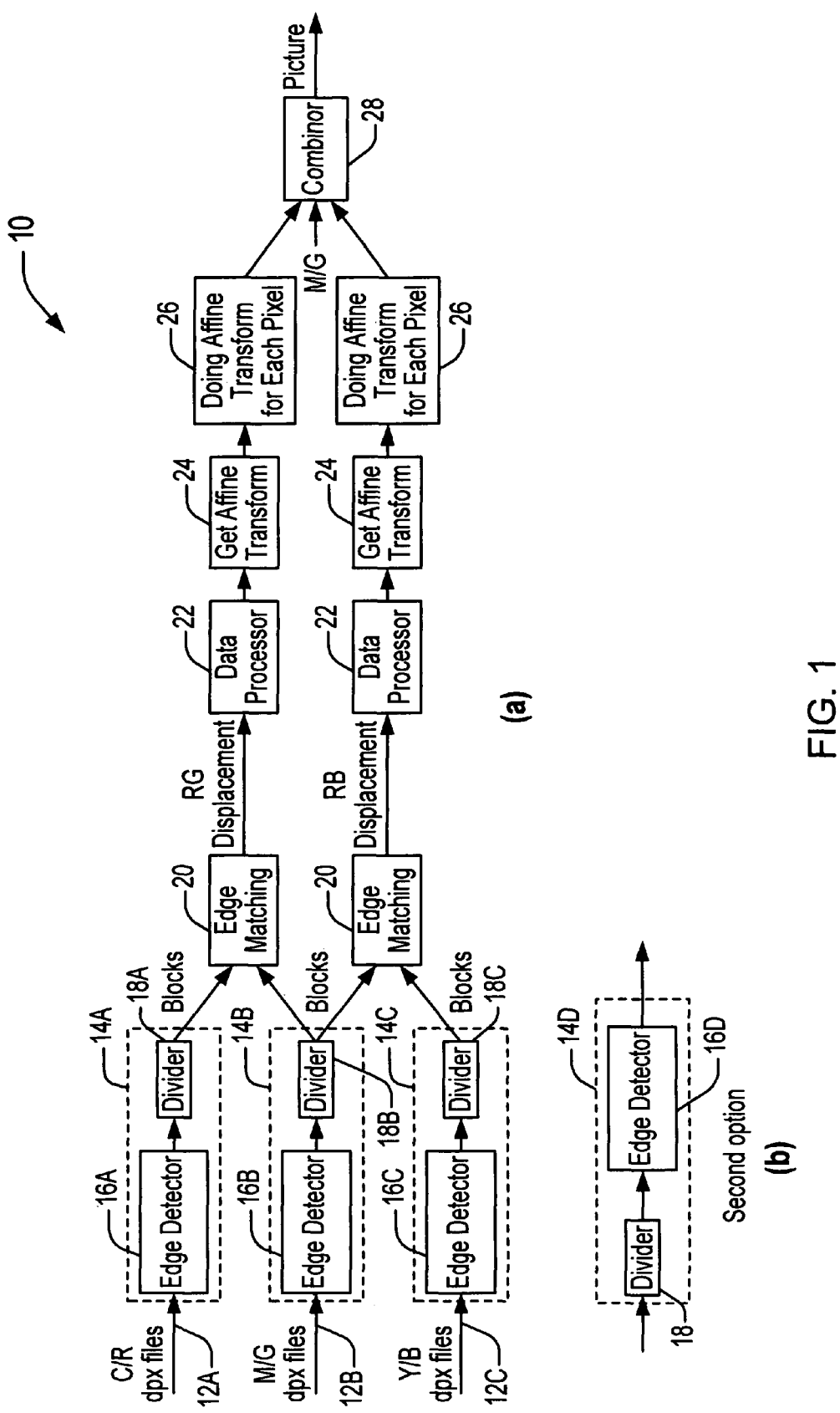
FIG. 1 is block diagram of the automatic color combination algorithm according to an embodiment of the invention.

The concepts of the present invention utilize known elements and processes in the film processing art. For example, the details of film processing, affine transformations, CMY registration, etc., are well known and not described in detail herein. In addition, the invention may be implemented using conventional programming techniques.

In a preferred embodiment, the invention is implemented in software. This invention can be, but is not limited to being, embedded in firmware, resident on microcomputer, microcode, etc. Other embodiments may be entirely hardware, entirely software, or a combination of hardware and software elements.

Additionally, the present invention can be in the form of a software product stored or accessible from any computer usable medium providing computer program code. This includes, but is not limited to any apparatus that may store, communicate, or propagate the program for use by or in connection with, any device capable of program execution. The medium may be optical, electronic, magnetic, electromagnetic, a transmission medium, or a semiconductor medium. A computer readable media may be embodied as a computer hard drive, removable computer disk, random access memory, read only memory, semiconductor or solid state memory device, magnetic tape, punch card, or optical disk. Current examples of optical disks include Compact Discs (CDs), Digital Video Discs (DVDs), High Definition DVDs (HD-DVDs), Laserdiscs, Blu-Ray Discs, Minidiscs, or magneto-optical discs. With the exception of Laserdiscs, all of these disks may be in a fixed read only memory (ROM), recordable (±R), or recordable/rewriteable (-RW) format.

A data processing system may be comprised of one or more processors with supporting electronic devices such as a motherboard. These processors may include memory resident on the processor or connected via a system bus to local memory, cache memory, or shared system or network memory. The data processing system may be coupled to input devices such as keyboards or mice, output devices such as displays or printers, and communications adapters such as network cards, modems, or networking backplanes.

Network adapters that may be included in a data processing system allow data to be transferred across an intervening public or private network to and from other terminals, servers, printers, or remote storage devices. Some current examples of network adapters are Ethernet adapters, wireless WiFi and WiMax adapters, token ring adapters, etc. Current networks include Local Area Networks (LANs), Wide Area Networks (WANs), the Internet, ad hoc networks, direct connect networks or virtual private networks (VPNs).

In accordance with the principles of the invention, the image registration process automatically performs registration for the Cyan, Magenta, and Yellow (CMY) color components in the digital domain. Those of ordinary skill in the art will recognize that concepts disclosed herein are not limited to C, M, and Y, and may be use for other color spaces as well, or between any two color components.

A 3-reel CMY film is scanned into three mono sequences. The picture size can be 2K or 4K (one K is 1024 bytes). In the film industry, the resolution of 2K is 2048×1556 pixels and the resolution of 4K is 4096×3112 pixels. The bit-depth of a pixel is irrelevant to the present invention and is typically 10 bits. The scanned files are illustratively stored in a dpx format (SMPTE (Society of Motion Picture and Television Engineers) Digital Picture Exchange Format). However, other file formats can be used and supported without departing from the spirit of the invention.

The registration process of the present invention operates on one frame of image data at a time. As described below, there may be circumstances that make it necessary to further divide the frame of image date into blocks and, if possible, sub blocks or sub pictures in order to continue the processing.

One factor that may require dividing the picture into blocks or sub blocks can be distortion of the source image data. Depending on the severity of distortion, the picture may require division into blocks (i.e., when the non-linearity of the distortion cannot be ignored). A block can have some overlap with its adjacent blocks or it can have no overlap at all. The number of blocks is determined based on the contents of the picture data, which number can be a very rough estimate before actually performing the block division.

Generally, increasing the accuracy of the registration process requires more blocks. However, increasing the number of blocks means each block will be smaller in size, and the smaller block size, the potential for lower accuracy in the calculated displacement accuracy is higher (i.e., if the block is too small, there may not be enough information, thus lower accuracy).

According the principles of the present invention very small blocks are not required to perform the automatic picture registration. Experimental results indicate that the number of blocks for 2K materials can be 1×1, 2×2, 2×4, 4×4, 4×6, or 4×8, to just name a few. Although possible, no more than 8 blocks in either dimension are should be required.

In order to register three (3) color components (e.g., CMY, RGB), the correlations between them need to be determined. There are several ways to calculate these correlations. Illustratively, edge correlation or edge matching is used. In this regard, there are two steps: edge detection and edge matching. Any existing edge detection techniques can be used, for example the Canny edge detection technique as known in the art. The edge matching is implemented after the edges are detected. Any of the three colors components to be registered can be chosen as a base, and displacements (i.e., correlations) of the other two color components can be calculated from the chosen base component.

By way of example, there are two displacement vectors for each block, $(V^x_{rg}, V^y_{rg})$, $(V^x_{rb}, V^y_{rb})$ where $V^x_{rg}$ is a displacement between red and green in the x direction, and $V^y_{rg}$ is a displacement between red and green in the y direction. Similarly, $V^x_{rb}$ and $V^y_{rb}$ are displacements between red and blue in the x and y directions, respectively. Here we assume the red component is used as the base.

In order to assist in the correlation determination, it is preferred to divide each frame into blocks. When the picture is divided into blocks, all the image data is better configured to be processed to eliminate big errors and to make the values of the displacements change smoothly across the picture. For example, a one-dimensional 3-order curve in either the x or y direction can be used, or a two-dimensional 3-order plane. Also, a lower order or a higher order curve or plane can be used. When the number of blocks in a direction is less than three, then no curve fit is taken for the displacement values.

The adjusted values of displacement (parameters) are used to calculate six parameters of an affine transform. Four displacement vectors are used to calculate the affine transform of each block, and redundancy can be used to reduce errors. However, the present invention does not require the use of redundancy to reduce errors, but may use it to find a pixel in a new picture to its corresponding location in the old picture, and obtain the pixel value by interpolating. The new picture is saved in a file format, such as dpx, yuv, raw, or ppm as known in the art.

An illustration of the automatic color combination process 10 is shown in FIG. 1*a*. The inputs 12*a*, 12*b*, and 12*c* are three separate color components. These color components can be stored in a single file or separate files. In a preferred embodiment, the inputs are three separate DPX files, one for each color component.

There are potentially two options in the next step 14: 1) Edges are detected first by an edge detector 16 and then the edge picture is divided into blocks using a divider 18 (See FIG. 1*a*); or 2) A picture can be divided into blocks first using a divider 18 and then implement edge detection 16 (See FIG. 1*b*). The resulting outputs for these two methods however, may be different. Step 14 is the first step in the correlation determination of the present invention.

Dividers 18 utilize two parameters to divide the picture, 1) the number of blocks in the horizontal direction, and 2) the number of blocks in the vertical direction. As mentioned above, the blocks can be overlapping or non-overlapping, where the portion of overlap can be varying, and the block size can be varying from one to another. If the block size is varying, the size is determined by the contents of the picture. The rich texture areas of the picture can have small blocks, and the less texture areas can have big blocks.

Figure 2:
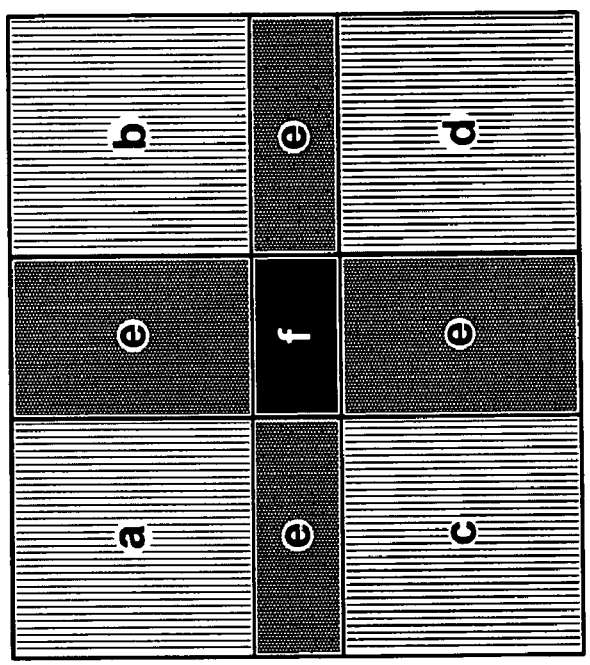
FIG. 2 is an example of a block division according to one embodiment of the invention.
Figure 3:
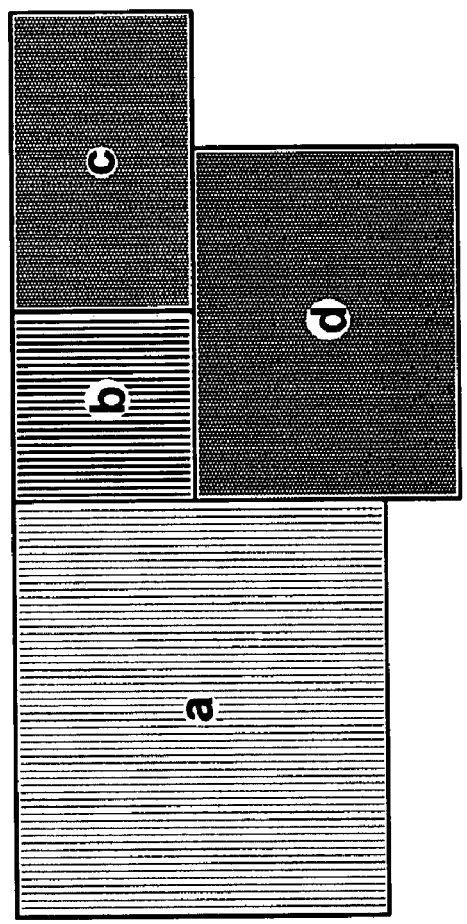
FIG. 3 is another example of a block division according to another embodiment of the invention.

FIG. 2 shows an embodiment of four (4) overlapping blocks of fixed size. Note, area e is where two adjacent blocks overlap, and area f is where all four blocks overlap. FIG. 3 shows an embodiment of four (4) non-overlapping blocks that vary in size.

As noted above, for performing edge detection, any existing edge detector can be used, such as, e.g., the above-mentioned Canny edge detector. All the edges are a single pixel thick for Canny edge detection. Other edge detectors may have multi-pixel thick edges.

As the final part of the correlation determination process, the divided/edge detected images are edge matched 20. There are several known ways to perform edge matching where the basic idea is the correlation of edges between two components. Generally, the number of edge points that are to be matched are counted. This counts the number of matched edge pixels, or can count the number of unmatched pixels. The search window is opened on the base color, and a non-base color component can be moved around, and at each position, the matched edge pixels are counted. The position having the maximum number of matched edge pixels is the displacement of the color component block.

Figure 4A:
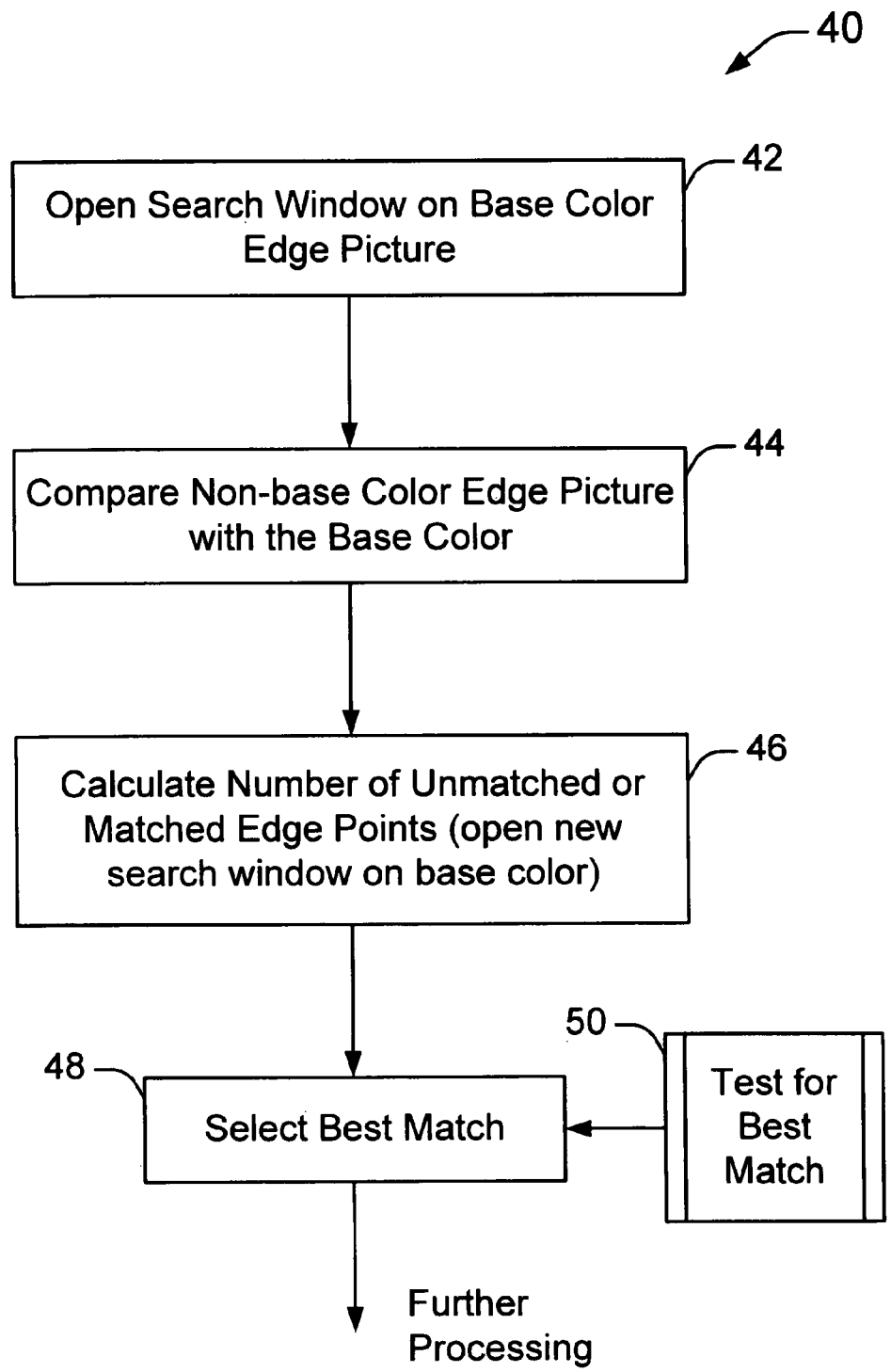
FIG. 4a is a flow diagram of the edge matching method according to an embodiment of the invention.

One exemplary process 40 for edge matching 20 is shown in FIG. 4*a*. Initially, a search window is opened on the base color edge picture (42). For each position in the search window, a non-base color edge block is compared with the base color (44). The number of unmatched edge points is calculated (46), and the smallest number is picked as the best match (48); or alternatively, the number of matched edge points is calculated (46) and the largest number is picked as the best match (48). The counting or calculating (46) of the number of matched or unmatched edge points is generally performed by opening another search window on the base color and moving a block of the non-base color component to find the best match.

According to other aspects of the invention, the initial search window may be opened on a non-base color edge picture, and for each position in the search window, a base color edge block is compared with the non-base color. In this manner, an edge map of the base color component may also be created.

According to other embodiments of the present invention, the best match may be tested (50) to avoid a mis-pick. One example of such a test is now described with reference to FIG. 4*b*. The number of the mismatch edge points at the position a should be less than the number of any of the eight (8) positions of b and d. A loose test is where the mismatch number at the position a should be less than any number at the four (4) positions of d. Those of skill in the art will recognize that that the data set may be low pass filtered first to obtain minimums or maximums, or simply to improve accuracy.

Figures 4B, 4C:
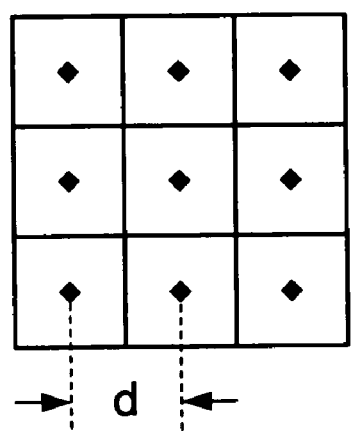

In further embodiments of the invention, the edge maps that are produced can be used to find the best match. By way of example, an edge map is created for each color component as follows:

A value is assigned to each edge pixel, for example 5 in the example shown in FIGS. 4*c*-4*e*. This value assignment is performed after the edges are determined (note, the edges may be one or multiple pixels thick);

Another value is assigned to each pixel that is located at a pixel distance d from a nearest edge pixel, for example 4, where d is the distance between two nearest pixels;

The pixels that are located at a distance of $\sqrt{2}$ d from a nearest edge pixel are given a value of 3;

The pixels that are located at a distance 2d from a nearest edge pixel are given a value of 2;

The pixels that are located at a distance $\sqrt{5}$ d from a nearest edge pixel are given a value of 1; and Other pixels are given values of 0.

Figure 4F:
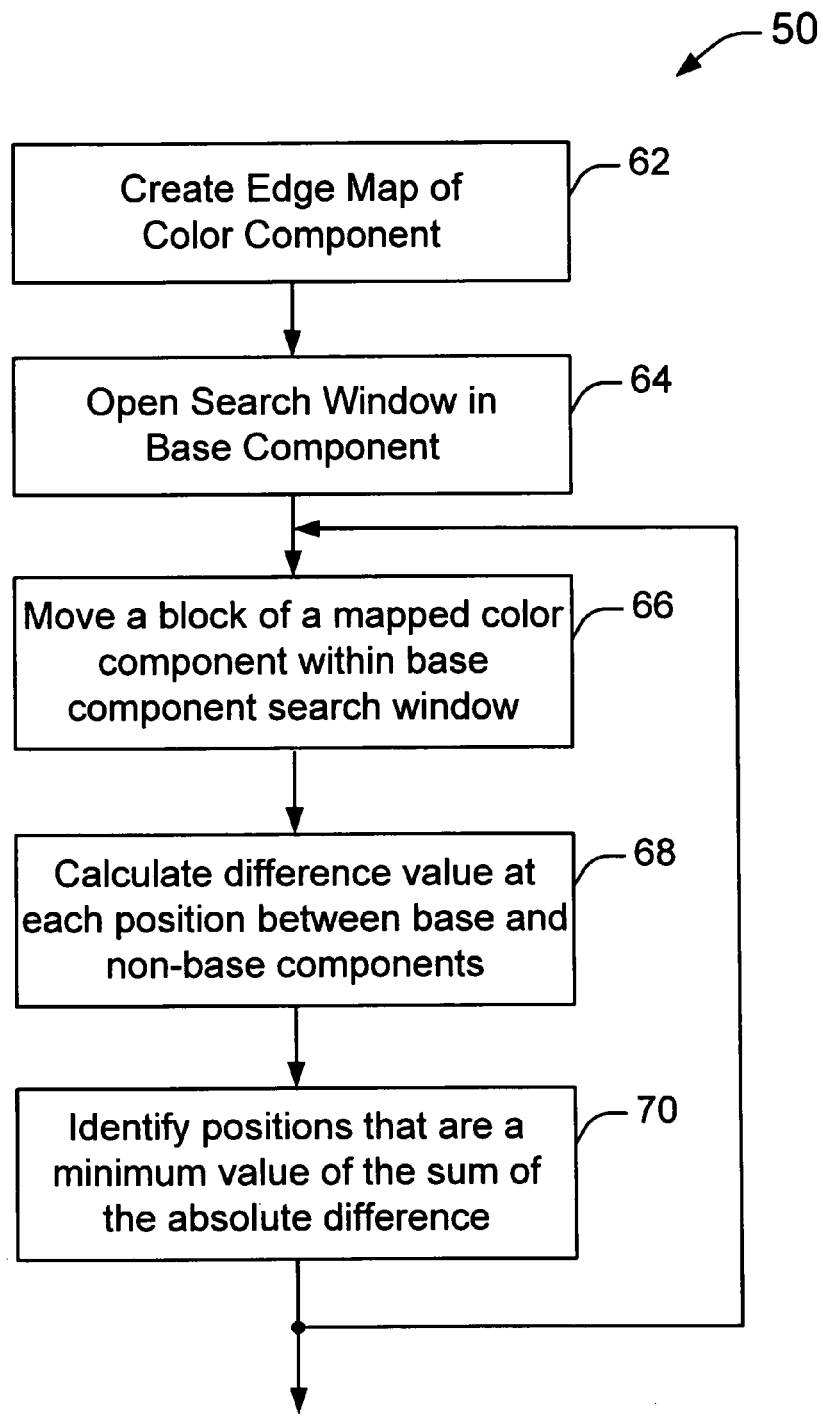
FIG. 4f is a flow diagram of the best matching test for the edge matching according to an embodiment of the invention.

FIG. 4*d* shows the creation of an edge map for a single pixel designated 5 in this figure and FIG. 4*f* shows a process 50 of testing for the best match in the edge map creation. After an edge map for each component is created (62), the correlation of the two color components (e.g., non-base color components) can be calculated. That is, the edge matching is performed on the created edge maps. FIG. 4*e* shows an example of an edge map according to this concept of the invention. A search window is opened in the base component (64), and a block of the non-base component is moved around within the base component window (66). At each position, the difference of each pixel is calculated between the non-base and base components (68). The position that has the minimum value of the sum of the absolute difference is identified (70) as the best match, and the corresponding displacement is the displacement of that color component block. The process of moving (66), calculating (68) and identifying (70) is repeated for each block of the color component being best match tested until all blocks are tested.

Once the edge matching is performed on the created edge maps, additional data processing 22 of the image may be required for the registration process. This data processing provides an error correction/prevention stage, and further improves accuracy by using the newly calculated displacement values (vectors). An illustrative technique for data processing 22 according with the principles of the invention is as follows. For each block, there are 2 displacement vectors (i.e., x and y). Each displacement vector represents a displacement between a color component edge map to the base color component edge map in the horizontal and vertical directions. For a picture of m by n blocks with a fixed block size, there are four sets of data: $V^{ij}_{1x}$, $V^{ij}_{1y}$, $V^{ij}_{2x}$, $V^{ij}_{2y}$ where ij are the indices of a block, and m, n are the number of blocks in x and y directions, respectively.

Here $V^{ij}_{1x}$ and $V^{ij}_{1y}$ are used as examples to show how to process the data. It is illustratively assumed that m=5, n=5, and $V^{ij}_{1x}$ is a 5×5 matrix.

Step 1: Use a pre-set threshold to find out if there are any big error numbers.

Step 2: Modify the big error numbers by using their neighbor values or by interpolation/extrapolation.

Step 3: Use 3-order curves to best fit the numbers in either direction or use a 3-order plane. For a 3-order curve:

$$f(x) = a_0 + a_1 * x + a_2 * x^2 + a_3 * x^3, \quad (1)$$

and $$f(y) = b_0 + b_1 * y + b_2 * y^2 + b_3 * y^3. \quad (2)$$

and for a 3-order plane:

$$f(x,y) = a_0 + a_1 * x + a_2 * y + a_3 * x^2 + a_4 * y^2 + a_5 * xy + a_6 * x^3 + a_7 * y^3 + a_8 * x^2 * y + a_9 * x * y^2. \quad (3)$$

where $a_i$, and $b_j$ are coefficients of the polynomial curve or plane. Certainly, lower order or higher order can be used.

If 3-order curve is used, for each row of a matrix, $[x_0, x_1, x_2, x_3, x_4]$, the corresponding polynomial coefficients are calculated as follows:

$$X = [1\ x_0 x_0^2 x_0^3; 1 x_1 x_1^2 x_1^3; 1 x_2 x_2^2 x_2^3; 1 x_3 x_3^2 x_3^3; 1 x_4 x_4^2 x_4^3], \quad (4)$$

where X is a 5×4 matrix, the semicolon ';' is a row separator and $x_i$ is the position of the corresponding block i in x direction in the row.

$$F = [f(x_0) f(x_1) f(x_2) f(x_3) f(x_4)], \quad (5)$$

where F is a vector and $f(x_i)$ is the displacement of the corresponding block i in the row.

$$A = [a_0 a_1 a_2 a_3], \quad (6)$$

where A is coefficient vector and is initially unknown. Then, $$F = X * A, \quad (7)$$

and $$A = (X^T X)^{-1} X^T F, \quad (8)$$

where $X^T X$ is positive definition, and it is inversible.

Step 4: Re-calculate the displacement values of F by using the coefficients A:

$$F' = X * A; \quad (9)$$

where F' is a new data set that is used to replace the old one. After all rows are processed, a new matrix is created with all the new numbers of F's. The parameters at most outside positions may be further modified, such that their values are within a certain range of the values of the second most outside parameters of the matrix.

A 3-order plane can be calculated in a similar fashion, except the matrix is bigger. For example, matrix X is 25×10, F is 10×1, and A is 10×1.

Once the data processing is complete, the Affine Transform for each color component block needs to be calculated 24 (See FIG. 1). For each color component, there are two data sets, one in the x-direction and the other in the y-direction. For each pixel position of a block, a nearest block analysis is used to determine the pixel position in the original picture. The present invention is described using the four nearest neighbor blocks to make this determination. However, those of skill in the art will recognize that the number of blocks used in a nearest block analysis is a matter of choice and can be higher or lower than the "four nearest neighbor" example described herein.

Figure 5A:
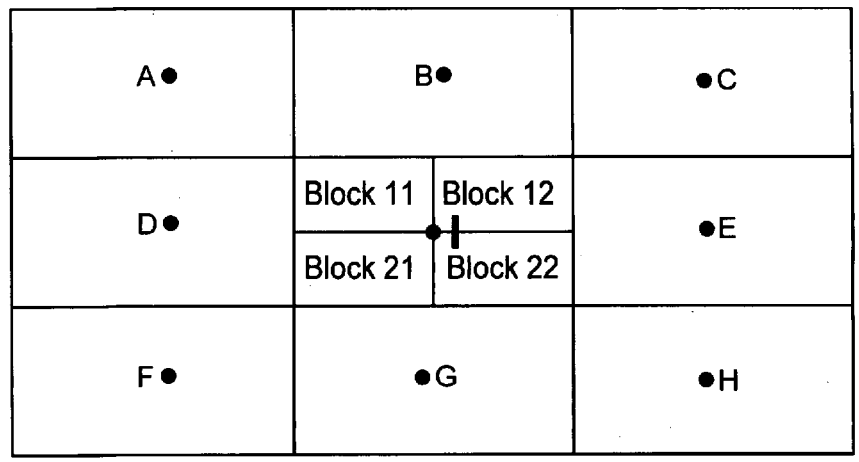
FIGS. 5a-5f show a further example of the block division and related affine transform displacement value application according to an embodiment of the invention.
Figure 5B:
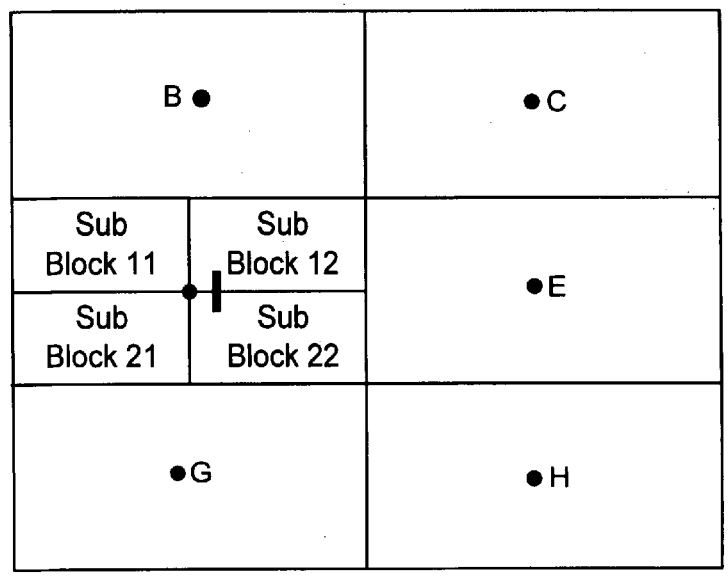
Figure 5C:
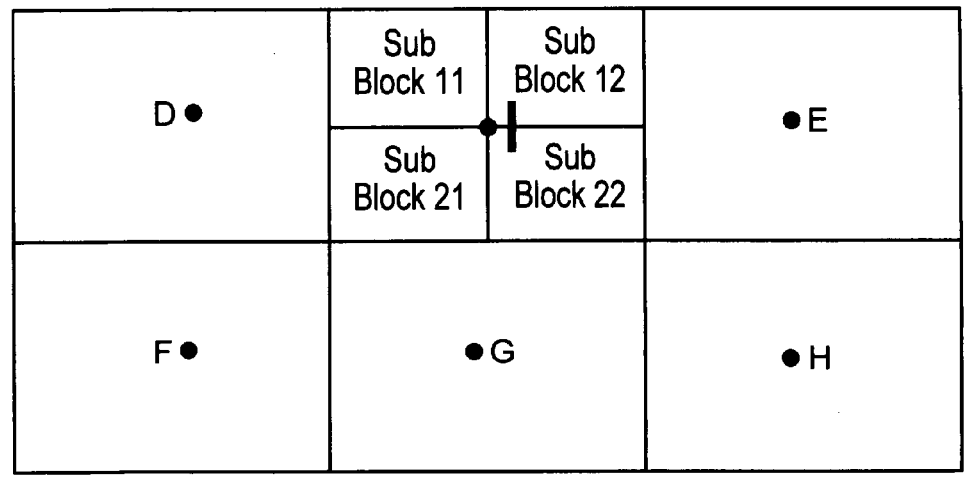
Figure 5D:
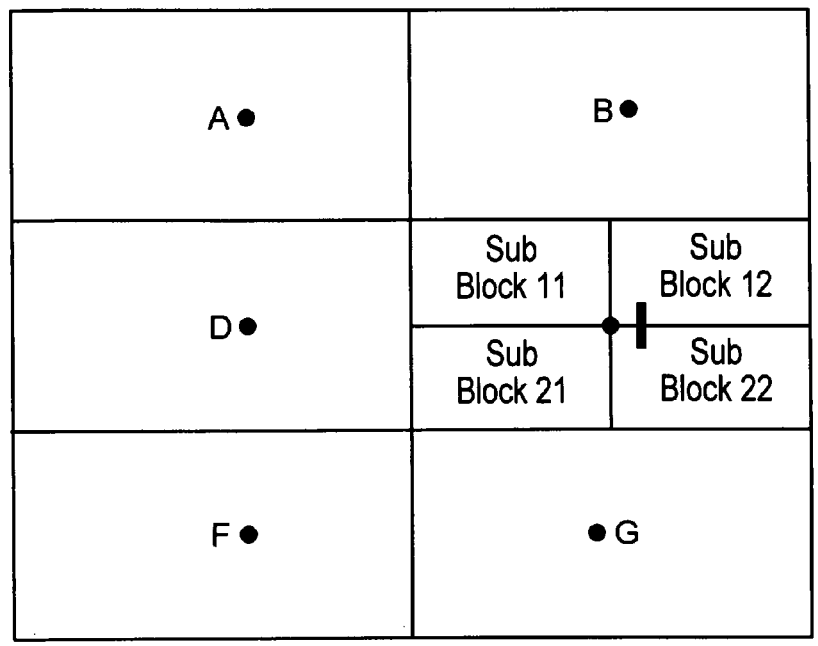
Figure 5E:
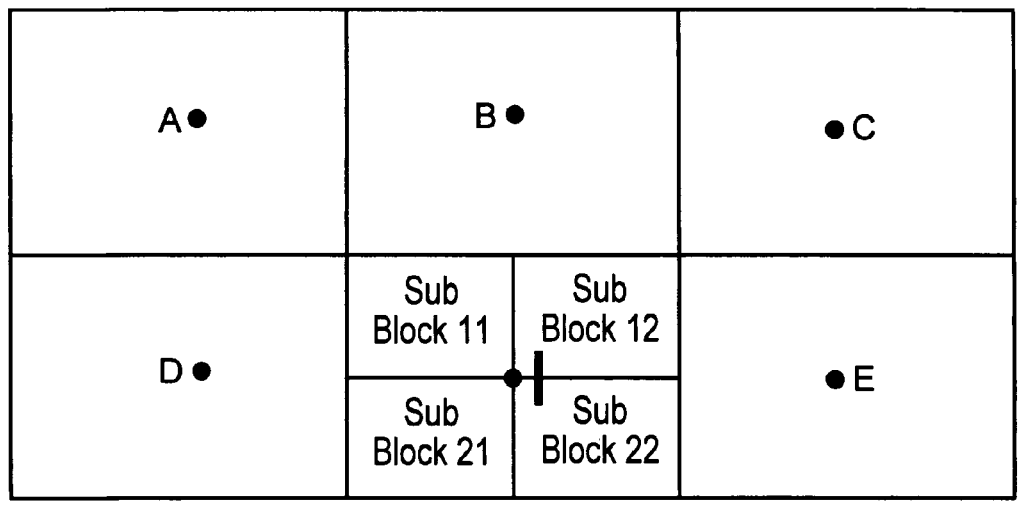
Figure 5F:
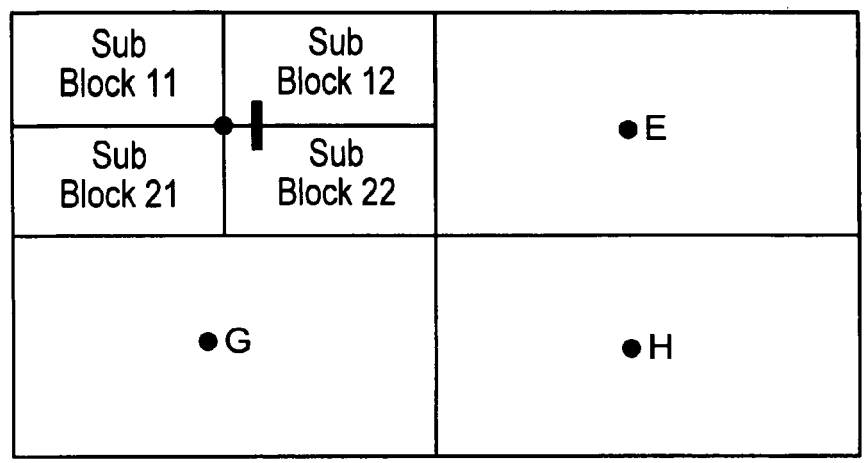

FIGS. 5a-f show an example of this concept. A more general case is shown in FIG. 5a where if a block (I) has eight neighbor blocks, sub block 11 will use the displacement values of blocks A, B, D, I to determine the parameters of the affine transformation. It follows that sub block 12 will use the displacement values of blocks B, C, E, and I, sub block 21 will use the displacement values of blocks D, F, I, G, and sub block 22 will use the displacement values of blocks E, H, G, and I. For other cases, if block I is located at a side or a corner of a picture (FIGS. 5e & 5f), then the respective sub block 11, 12, 21, 22 will use its nearest three neighboring blocks and block I to calculate the affine transform parameters.

Figure 6:
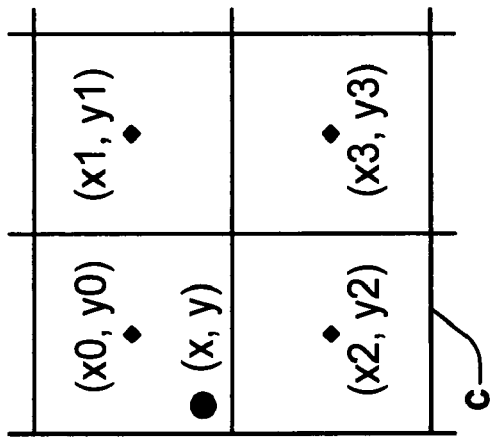
FIGS. 6a-6c are exemplary data sets used to represent the calculation of the affine transform according to an embodiment of the invention.
Figure 6:
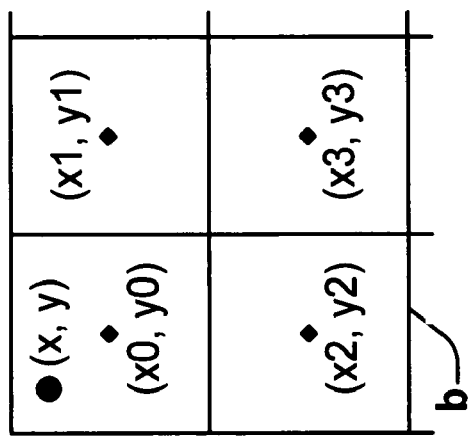
Figure 6:
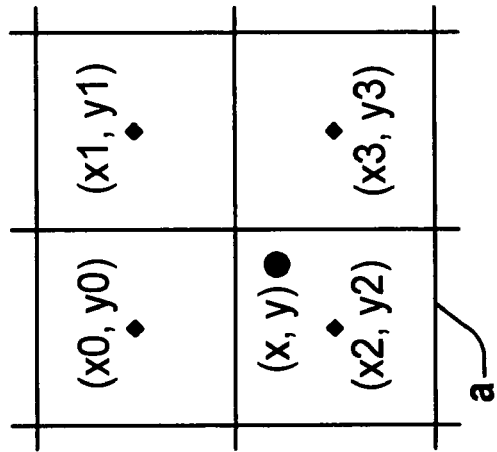

FIGS. 6a, 6b and 6c indicate the new pixel (x, y) in the middle of 4 block centers (FIG. 6a), at a picture corner (FIG. 6b), and at one side of the 4 block centers (FIG. 6c), respectively.

The affine transform is shown below, $$\begin{bmatrix} x_{old} \\ y_{old} \end{bmatrix} = \begin{bmatrix} a_0 & b_0 & c_0 \\ a_1 & b_1 & c_1 \end{bmatrix} \begin{bmatrix} x_{new} \\ y_{new} \\ 1 \end{bmatrix}. \quad (10)$$

The positions of the 4 old points (block centers) are known (shown in FIG. 6), and the positions of the 4 points in the new picture can be obtained by adding the displacements to the corresponding points. There are 8 equations and six unknowns, as such, the 6 parameter affine transform can be easily obtained. In some cases when more than two equations are linear combinations of the other equations, the affine transform is reduced to:

$$\begin{bmatrix} x_{old} \\ y_{old} \end{bmatrix} = \begin{bmatrix} a_0 & 0 & c_0 \\ 0 & b_1 & c_1 \end{bmatrix} \begin{bmatrix} x_{new} \\ y_{new} \\ 1 \end{bmatrix}. \quad (11)$$

Figure 7:
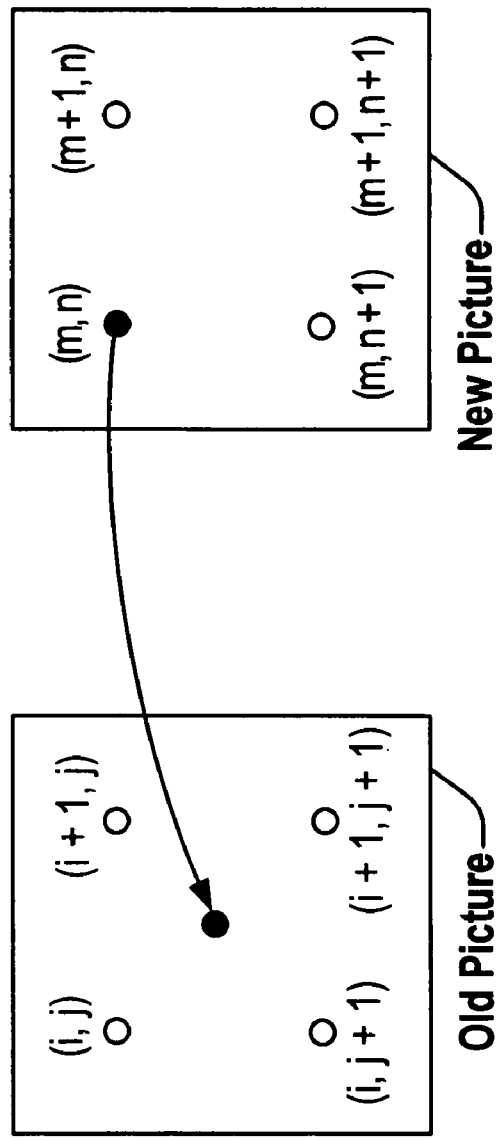
FIG. 7 is a diagrammatic representation of the method for obtaining the warping component picture using the calculated Affine Transform according to an embodiment of the invention.

For warping of a picture (step 28 FIG. 1), warping is applied to two of the three color components. More generally, if there are N components, warping will be applied to N−1 color components. Those of skill in the art will recognize that image warping is one kind of image transformations, which can be linear or non-linear transformation. The one color component that is used for the base will not be warped (in the exemplary case of FIG. 1, M/G). The warping component picture is obtained by using the calculated affine transform to map each pixel in the new picture onto the old picture (illustrated in FIG. 7) This is done by combining (28) the two warping color components with the base color component to form the registered color image. The mapped pixel (m,n) in the old picture is normally not on the integer grid, however, the value of the pixel can be obtained by using interpolation or the nearest pixel value. Any of several known interpolation techniques, such as bi-linear, bi-cubical, etc. may be used for this purpose. After warping, the three color components can be converted to certain desired file or image formats, and form a registered color image.

The above-described automatic registration process has been tested on a number of films with good results.

In order to speed up the registration process, the picture can be down sampled to a lower resolution, for example from 4K down sampled to 2K, and the best matched displacement vectors of each sub picture can be computed at the lower resolution. Then the matched displacement vectors are up-scaled to the original resolution, these vectors are used to perform the picture warping at original resolution, 4K.

In another case, in order to reduce the scanning cost, lower resolution is used. Thus, the lower scanned resolution, the lower the cost. The magenta channel can be scanned at the high resolution, for example 4K, and cyan and yellow channels can be scanned at lower resolution, for example 2K. The magenta channel is the most dominant of the three channels, thus enabling this different resolution approach to the less dominant cyan and yellow channels. This process effectively up-scales the cyan and yellow channels to the resolution of the magenta channel. Then the registration can be done in high resolution.

It should also be noted that the above-described registration process can occur at the original separation of a color film into the CMY components as a check on the quality of the separation, e.g., to check if a component of a picture is missing or is damaged, etc.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. It is therefore to be understood that numerous modifications may be made to the illustrative embodiments and that other arrangements may be devised without departing from the spirit and scope of the present invention as defined by the appended claims.

What is claimed is:

1. A method for edge matching comprising:
creating an edge map of a non base color component;
opening a search window in a base color component;
moving a block of the non-base color component within the search window of the base color component;
calculating difference values for each position between the non base and base color component;
identifying a position that has a minimum value of the sum of all of the calculated differences; and
selecting, as a displacement for said block of the non-base color component, a displacement associated with said position that has said minimum value;
wherein said creating an edge map comprises:
assigning a first value to each edge pixel;
assigning a second value to each pixel that is located at a pixel distance (d) from a nearest edge pixel;
assigning a third value to each pixel that is located a distance $\sqrt{2}$ d from the nearest edge pixel;
assigning a fourth value to each pixel that is located a distance 2 times the pixel distance d from the nearest edge pixel;
assigning a fifth value to each pixel that is located a distance $\sqrt{5}$ from the nearest edge pixel; and
assigning all other pixels a value of zero.

2. The method according to claim 1, wherein said creating an edge map comprises assigning a value to a pixel position according to its distance from an edge pixel.

3. The method according to claim 1, further comprising calculating correlations between base and non-base components once the edge map has been created for each component.

4. The method according to claim 1, further comprising calculating correlations between base and non-base components once the edge map has been created for the non-base components.

5. The method according to claim 1, further comprising repeating said steps of moving, calculating and identifying for each block of the non-base color component.

6. A method for edge matching comprising:
creating an edge map of a non base color component;
opening a search window in a base color component;
moving a block of the non-base color component within the search window of the base color component;
calculating difference values for each position between the non base and base color component;
identifying a position that has a minimum value of the sum of all of the calculated differences; and
selecting, as a displacement for said block of the non-base color component, a displacement associated with said position that has said minimum value;
wherein said creating an edge map comprises assigning a value to a pixel position according to its distance from an edge pixel; and
wherein said assigned values are mapped onto a grid to form the edge map, said steps of moving, calculating and identifying being done on the edge maps.

7. The method according to claim 1, wherein said assigned values are mapped onto a grid to form the edge map, said steps of moving, calculating and identifying being done on the edge maps.

8. A method for edge matching comprising:
creating an edge map of a first color component;
opening a search window in second color component;
moving a block of the first color component within the search window of the second color component;
calculating difference values for each position between the first and second color component;
identifying a position that has a minimum value of the sum of all of the calculated differences; and
selecting, as a displacement for said block of the first color component, a displacement associated with said position that has said minimum value;
wherein said creating an edge map comprises:
assigning a first value to each edge pixel;
assigning a second value to each pixel that is located at a pixel distance (d) from a nearest edge pixel;
assigning a third value to each pixel that is located a distance $\sqrt{2}$ d from the nearest edge pixel;
assigning a fourth value to each pixel that is located a distance 2 times the pixel distance d from the nearest edge pixel;
assigning a fifth value to each pixel that is located a distance $\sqrt{5}$ d from the nearest edge pixel; and
assigning all other pixels a value of zero.

9. The method according to claim 8, wherein said creating an edge map comprises assigning a value to a pixel position according to its distance from an edge pixel.

10. The method according to claim 8, further comprising calculating correlations between the first and second color components once the edge map has been created for each component.

11. The method according to claim 8, further comprising calculating correlations between the first and second color components once the edge map has been created for the first components.

12. The method according to claim 6, further comprising calculating correlations between base and non-base components once the edge map has been created for each component.

13. The method according to claim 6, further comprising calculating correlations between base and non-base components once the edge map has been created for the non-base components.

14. The method according to claim 6, further comprising repeating said steps of moving, calculating and identifying for each block of the non-base color component.

* * * * *